United States Patent
Iwasawa

(10) Patent No.: US 10,929,074 B2
(45) Date of Patent: Feb. 23, 2021

(54) INFORMATION PROCESSING APPARATUS CAPABLE OF EXECUTING A COMMON CONTROL PROGRAM FOR CONTROLLING, MANAGEMENT APPARATUS, INFORMATION PROCESSING SYSTEM, AND NON-TRANSITORY COMPUTER READABLE MEDIUM WITH COMMON CONTROL PROGRAM THEREIN

(71) Applicant: FUJI XEROX CO., LTD., Tokyo (JP)

(72) Inventor: Masayuki Iwasawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/542,288

(22) Filed: Aug. 15, 2019

(65) Prior Publication Data

US 2020/0285433 A1 Sep. 10, 2020

(30) Foreign Application Priority Data

Mar. 6, 2019 (JP) .............................. JP2019-040274

(51) Int. Cl.
*G06F 3/12* (2006.01)
*G06F 3/0482* (2013.01)

(52) U.S. Cl.
CPC .......... *G06F 3/1231* (2013.01); *G06F 3/0482* (2013.01); *G06F 3/1204* (2013.01)

(58) Field of Classification Search
None
See application file for complete search history.

(56) References Cited

U.S. PATENT DOCUMENTS

| | | | | |
|---|---|---|---|---|
| 2004/0213614 | A1* | 10/2004 | Uchida | G06F 3/1285 400/62 |
| 2014/0043636 | A1* | 2/2014 | Akatsu | G06F 3/1228 358/1.13 |
| 2015/0248259 | A1* | 9/2015 | Kumagai | G06K 15/1805 358/1.13 |
| 2017/0093865 | A1* | 3/2017 | Watanabe | G06F 3/1288 |
| 2019/0373130 | A1* | 12/2019 | Han | H04N 1/00938 |

FOREIGN PATENT DOCUMENTS

JP 2002183434 6/2002

* cited by examiner

*Primary Examiner* — Thomas D Lee
(74) *Attorney, Agent, or Firm* — JCIPRNET

(57) ABSTRACT

An information processing apparatus includes a reception unit that receives an instruction to obtain a model information file, which is list information regarding models controllable by a common control program, an input unit that, if the reception unit receives the instruction to obtain the model information file, inputs identification information regarding the information processing apparatus, and an obtaining unit that obtains, from an external management apparatus, a model information file corresponding to the identification information input by the input unit.

7 Claims, 15 Drawing Sheets

FIG. 6

| MODEL SELECTION LIST | | |
|---|---|---|
| PR- 2001 | ● VALID | ○ INVALID |
| PR- 2100 | ● VALID | ○ INVALID |
| PR- 2100N | ○ VALID | ● INVALID |
| PR- 2110 | ○ VALID | ● INVALID |
| PR- 2120 | ● VALID | ○ INVALID |
| ⋮ | ⋮ | |

SET   CANCEL

| USER ID | PASSWORD | MODEL SETTING INFORMATION 53 |
|---------|----------|------------------------------|
| AAAA    | aaaa     | 1001                         |
| BBBB    | bbbb     | 1002                         |
| CCCC    | cccc     | 1003                         |
| ⋮       | ⋮        | ⋮                            |

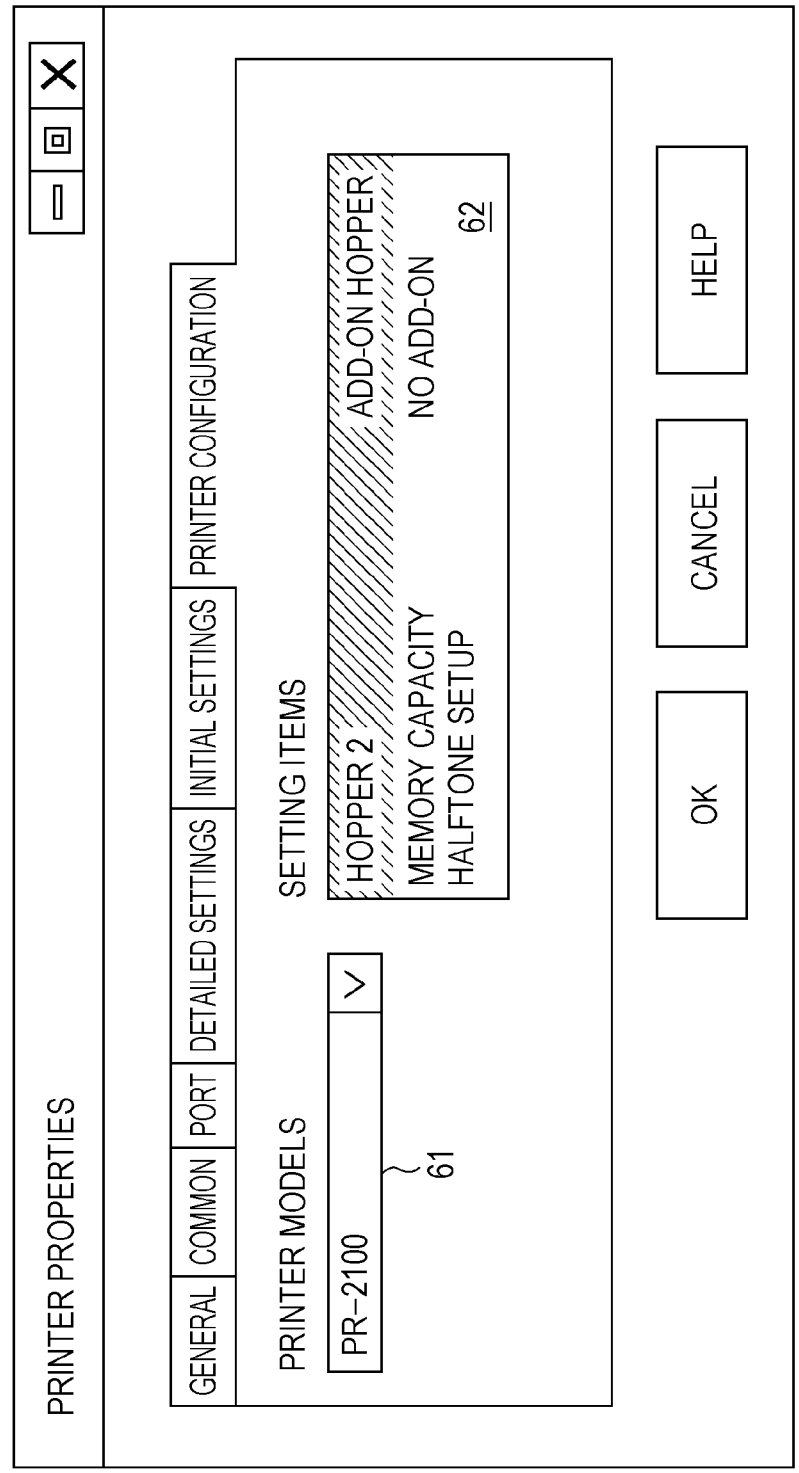

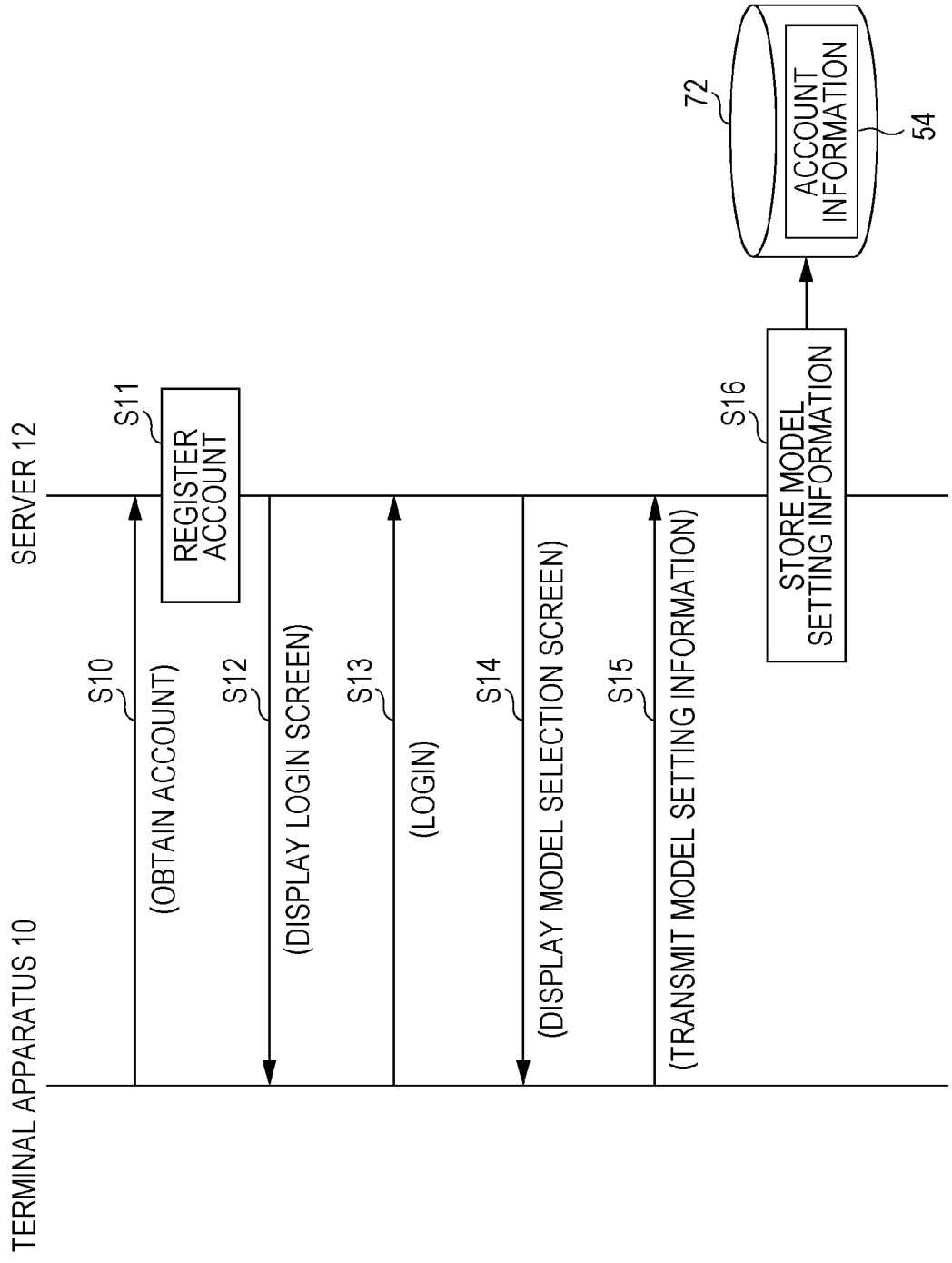

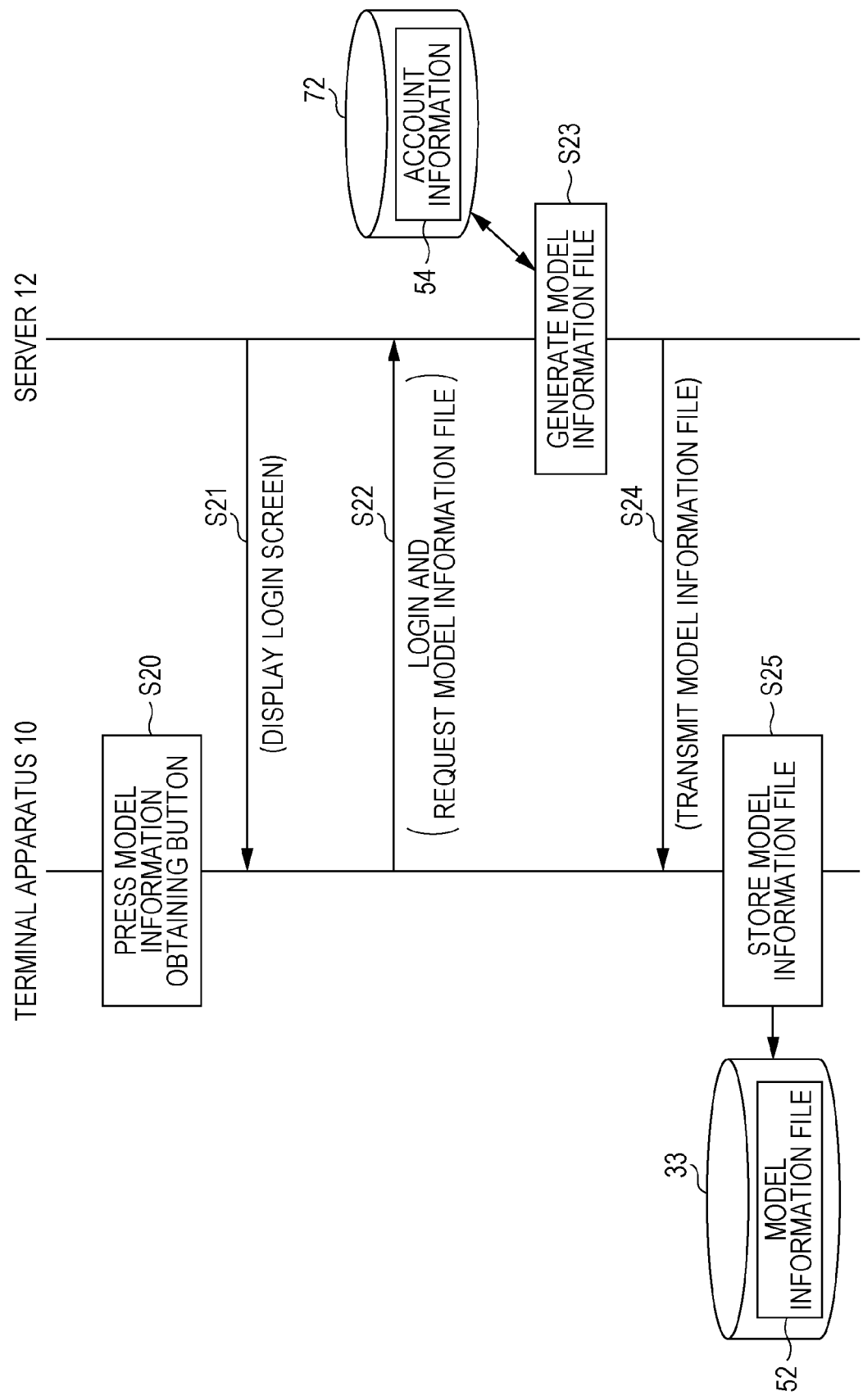

INFORMATION PROCESSING APPARATUS CAPABLE OF EXECUTING A COMMON CONTROL PROGRAM FOR CONTROLLING, MANAGEMENT APPARATUS, INFORMATION PROCESSING SYSTEM, AND NON-TRANSITORY COMPUTER READABLE MEDIUM WITH COMMON CONTROL PROGRAM THEREIN

CROSS-REFERENCE TO RELATED APPLICATIONS

This application is based on and claims priority under 35 USC 119 from Japanese Patent Application No. 2019-040274 filed Mar. 6, 2019.

BACKGROUND

(i) Technical Field

The present disclosure relates to an information processing apparatus, a management apparatus, an information processing system, and a non-transitory computer readable medium.

(ii) Related Art

In Japanese Unexamined Patent Application Publication No. 2002-183434, a method for supporting remote maintenance is disclosed. The method includes operating, by a user or a manager of a computer system, a certain maintenance key switch provided for the computer system if an apparatus included in the computer system needs to be maintained, accessing, through a network using the computer system as a result of the operation performed on the maintenance key switch, a maintenance information provision server that stores electronic maintenance support information in a database and automatically transmitting information for identifying the apparatus and state information to the maintenance information provision server through the network, searching, using the maintenance information provision server on the basis of the information transmitted from the computer system, the database for maintenance support information regarding the apparatus and transmitting the found maintenance support information to the computer system through the network, and receiving, using the computer system, the maintenance support information transmitted from the maintenance information provision server and outputting a cause of a failure of the apparatus and a maintenance method to an output apparatus.

SUMMARY

Aspects of non-limiting embodiments of the present disclosure relate to an information processing apparatus, a management apparatus, an information processing system, and a non-transitory computer readable medium capable of making it unnecessary to update a common control program for controlling a plurality of apparatuses whose models are different from one another even when compatible models of the common control program have changed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a reception unit that receives an instruction to obtain a model information file, which is list information regarding models controllable by a common control program, an input unit that, if the reception unit receives the instruction to obtain the model information file, inputs identification information regarding the information processing apparatus, and an obtaining unit that obtains, from an external management apparatus, a model information file corresponding to the identification information input by the input unit.

BRIEF DESCRIPTION OF THE DRAWINGS

An exemplary embodiment of the present disclosure will be described in detail based on the following figures, wherein:

FIG. 6 is a diagram illustrating an example of a display screen of a display unit of the terminal apparatus according to the exemplary embodiment of the present disclosure;

FIG. 7 is a diagram illustrating an example of account information stored in a storage unit of the server according to the exemplary embodiment of the present disclosure;

FIGS. 9A and 9B are diagrams illustrating examples of another display screen of the display unit of the terminal apparatus according to the exemplary embodiment of the present disclosure;

FIG. 10 is a diagram illustrating an example of an operation performed by the information processing system according to the exemplary embodiment of the present disclosure;

FIG. 11 is a diagram illustrating an example of another operation performed by the information processing system according to the exemplary embodiment of the present disclosure;

DETAILED DESCRIPTION

Next, an exemplary embodiment of the present disclosure will be described in detail with reference to the drawings.

Figure 1:
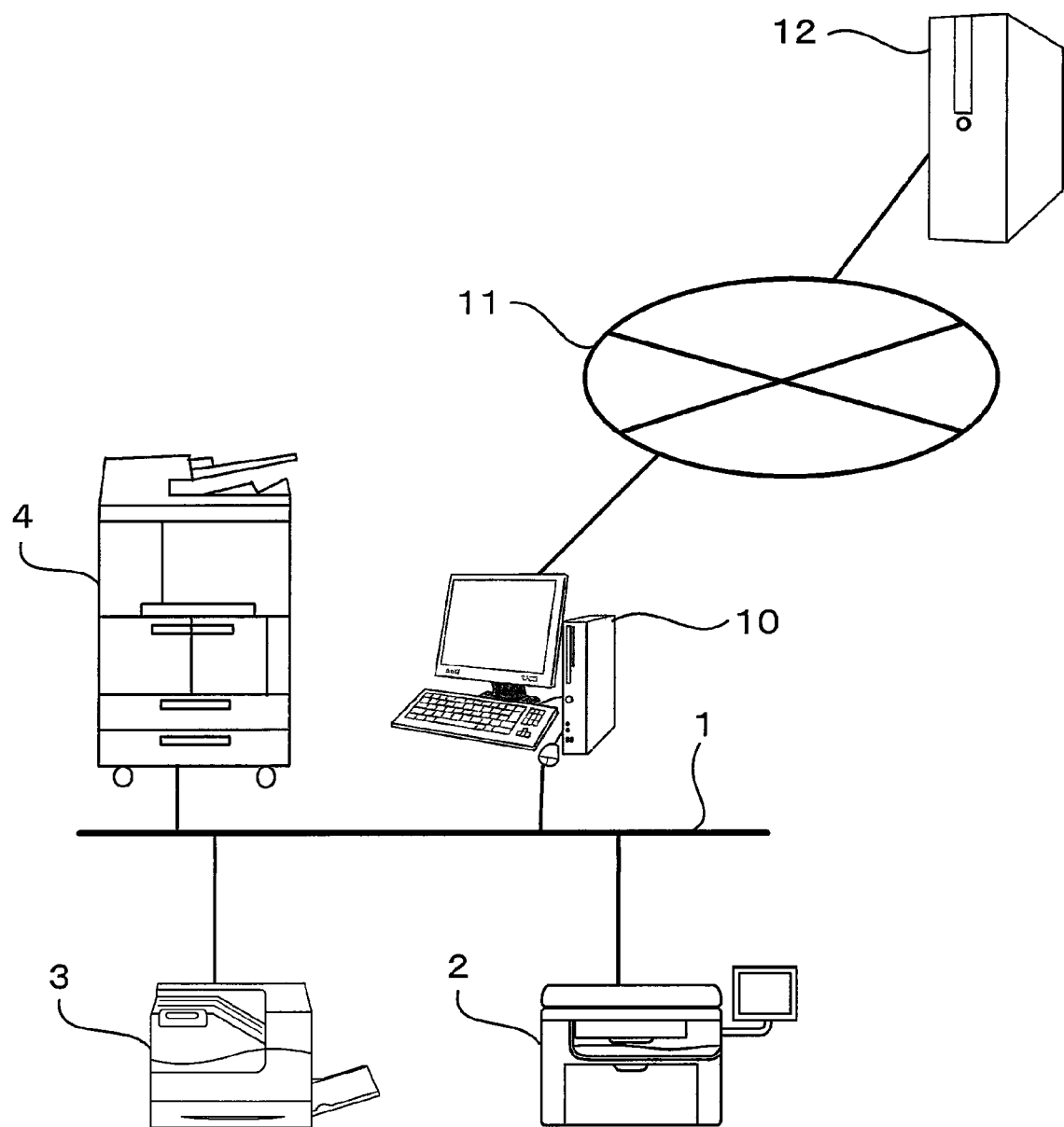
FIG. 1 is a system diagram illustrating the configuration of an information processing system according to an exemplary embodiment of the present disclosure.

FIG. 1 is a diagram illustrating the configuration of an information processing system according to the exemplary embodiment of the present disclosure.

As illustrated in FIG. 1, the information processing system according to the exemplary embodiment of the present disclosure includes a terminal apparatus 10 that serves as an information processing apparatus, such as a personal computer, printers 2, 3, and 4 that serve as image forming apparatuses, such as multifunction peripherals (MFPs), and a server 12.

The terminal apparatus 10 and the server 12 are connected to each other by the Internet 11 and communicate information with each other.

The terminal apparatus 10 and the printers 2, 3, and 4 are connected to each other by a local area network (LAN) 1 and communicate information with each other.

The terminal apparatus 10 generates a print job and transmits the generated print job to the printer 2, 3, or 4 through the LAN 1. The printer 2, 3, or 4 that has received the print job from the terminal apparatus 10 outputs an image based on the print job to a sheet.

The printers 2, 3, and 4 connected to the LAN 1 are so-called "multivendor apparatuses" whose models are different from one another and that have been manufactured by different manufacturers.

A common driver capable of controlling a plurality of printers whose models are different from one another is installed on the terminal apparatus 10. The terminal apparatus 10 executes a common control program using the common driver to control such printers.

The common control program is software capable of controlling a plurality of apparatuses whose models are different from one another. That is, by installing and updating the common driver on the terminal apparatus 10, a plurality of printers whose models are different from one another can be controlled, and a printer driver for each model need not be installed or updated.

The server 12 is a web server, for example, including the common driver. That is, a user of the terminal apparatus 10 can access the server 12 through the Internet 11 and install and update the common driver.

Figure 2:
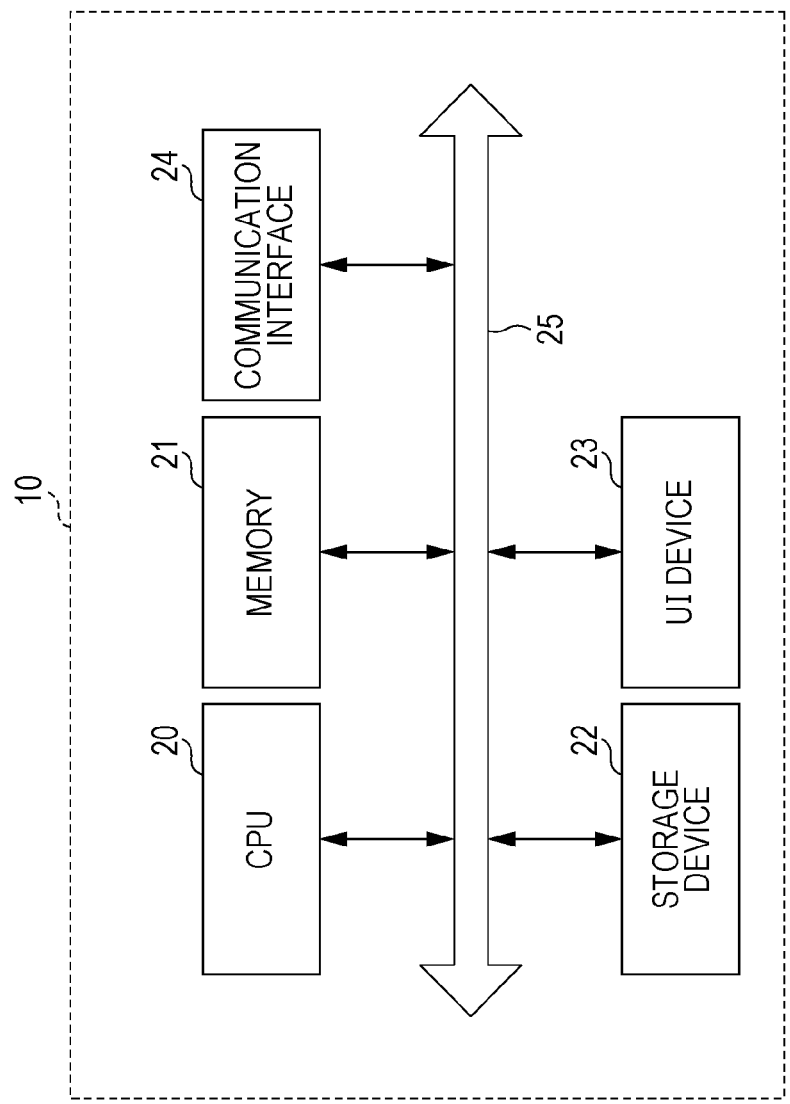
FIG. 2 is a block diagram illustrating the hardware configuration of a terminal apparatus according to the exemplary embodiment of the present disclosure.

FIG. 2 illustrates the hardware configuration of the terminal apparatus 10 in the information processing system according to the present exemplary embodiment.

As illustrated in FIG. 2, the terminal apparatus 10 includes a central processing unit (CPU) 20, a memory 21 capable of temporarily storing data, a storage device 22 such as a hard disk drive (HDD), a user interface (UI) device 23 including a touch panel or a liquid crystal display and a keyboard, and a communication interface 24 that communicates data with external apparatuses through networks such as the LAN 1 and the Internet 11. These components are connected to one another by a control bus 25.

The CPU 20 controls the operation of the terminal apparatus 10 by performing a certain process on the basis of the common control program stored in the memory 21 or the storage device 22. Although the CPU 20 reads and executes the common control program stored in the memory 21 or the storage device 22 in the present exemplary embodiment, the common control program may be stored in a storage medium such as a compact disc read-only memory (CD-ROM) and provided for the CPU 20.

Figure 3:
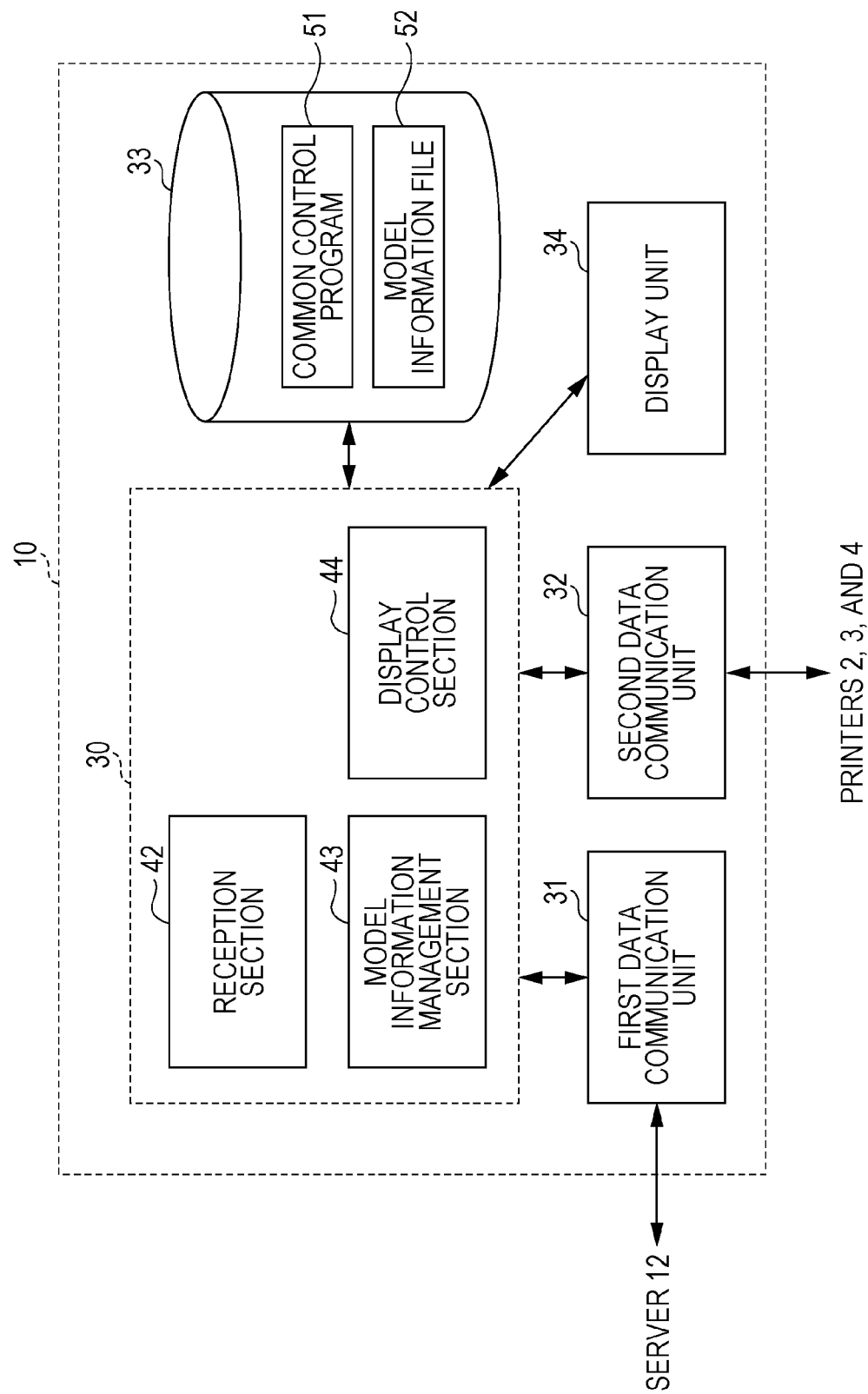
FIG. 3 is a diagram illustrating the functional configuration of the terminal apparatus according to the exemplary embodiment of the present disclosure.

FIG. 3 is a block diagram illustrating the functional configuration of the terminal apparatus 10 achieved by executing the common control program.

As illustrated in FIG. 3, the terminal apparatus 10 according to the present exemplary embodiment includes a control unit 30, a first data communication unit 31, a second data communication unit 32, a storage unit 33, and a display unit 34.

The first data communication unit 31 communicates data with the server 12 through the Internet 11.

The second data communication unit 32 communicates data with the printers 2, 3, and 4 through the LAN 1.

The display unit 34 displays, on a display screen, an operation screen for operating the printers 2, 3, and 4 and the server 12. The display unit 34 receives, on the display screen, operations performed on the printers 2, 3, and 4 and the server 12.

The storage unit 33 stores a common control program 51, a model information file 52, and the like. The model information file 52 is saved, for example, in a registry.

The terminal apparatus 10 functions as a reception section 42, a model information management section 43, a display control section 44, and the like by executing the common control program 51 stored in the storage unit 33 using the control unit 30.

The common control program 51 causes the control unit 30 to operate as the reception section 42, the model information management section 43, the display control section 44, and the like.

The model information file 52 is obtained from the server 12 and stored in the storage unit 33 as a part of files of the common driver along with data regarding the common control program 51 when the common driver is installed or updated. A customized model information file 52, which will be described later, is also obtained from the server 12 and stored in the storage unit 33.

The customized model information file 52 is information that includes, among models that can be controlled by the common control program 51, models to be used with the terminal apparatus 10 in a model list 61 and that excludes models not to be used with the terminal apparatus 10 from the model list 61.

Figure 4:
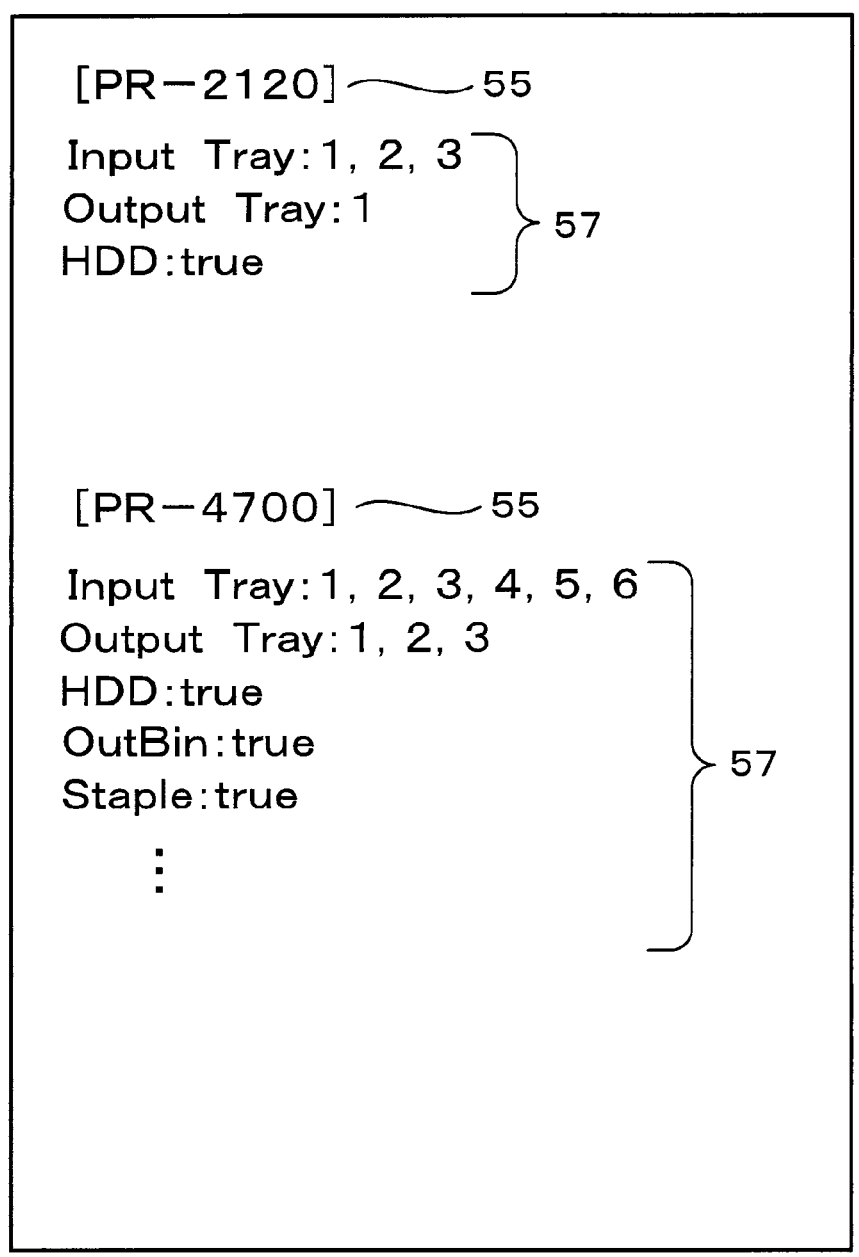
FIG. 4 is a diagram illustrating an example of a model information file stored in a storage unit of the terminal apparatus according to the exemplary embodiment of the present disclosure.

As illustrated in FIG. 4, for example, the model information file 52 includes model information 55 regarding the model names of the plurality of printers 2, 3, and 4 and option information 57 indicating setting items, such as information regarding input trays for each model name, information regarding output trays for each model name, information regarding the HDD, information regarding output bins, and information regarding a stapling function.

The reception section 42 receives an instruction to obtain a customized model information file 52. If the reception section 42 receives an instruction to obtain a customized model information file 52, the display control section 44 displays, on the display unit 34, an input screen for asking the user to input a user identifier (ID), which is identification information regarding the user, and a password. At this time, the display unit 34 functions as an input unit for inputting a user ID, which is identification information, and a password.

The model information management section 43 obtains update data for the common control program 51 and the model information file 52 from the server 12 and stores the update data and the model information file 52 in the storage unit 33. The model information management section 43 also receives, from the reception section 42, an instruction to obtain a customized model information file 52. If a user ID and a password are input, the model information management section 43 obtains a customized model information file 52 from the server 12 and stores the customized model information file 52 in the storage unit 33.

The display control section 44 displays, on the display unit 34, the model list 61 and a setting item list 62 set for each model name on a printer property screen on the basis of the model information file 52 stored in the storage unit 33. That is, the display control section 44 displays the model list 61 and the setting item list 62 set for each model name on the basis of a model information file 52 obtained along with the common control program or a customized model information file 52.

Figure 5:
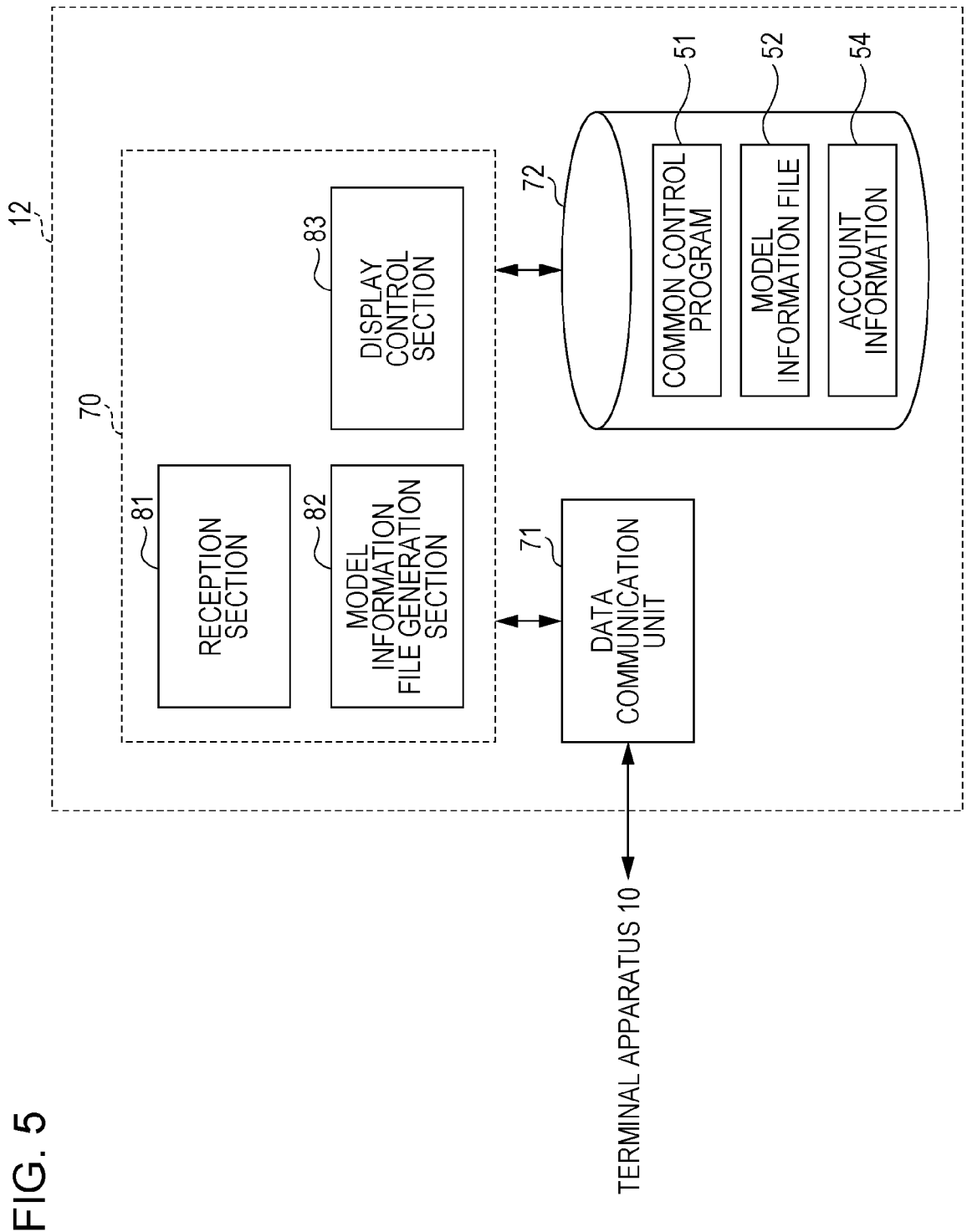
FIG. 5 is a diagram illustrating the functional configuration of a server according to the exemplary embodiment of the present disclosure.

FIG. 5 is a block diagram illustrating the functional configuration of the server 12.

As illustrated in FIG. 5, the server 12 according to the present exemplary embodiment includes a control unit 70, a data communication unit 71, and a storage unit 72.

The data communication unit 71 communicates data with the terminal apparatus 10 and the like through the Internet 11.

The storage unit 72 stores the common control program 51, the model information file 52, account information 54, and the like.

The server 12 functions as a reception section 81, a model information file generation section 82, a display control section 83, and the like by executing the common control program 51 stored in the storage unit 72 using the control unit 70.

The common control program 51 causes the control unit 70 to operate as the reception section 81, the model information file generation section 82, the display control section 83, and the like.

The display control section 83 displays, on the display unit 34 of the terminal apparatus 10, an account obtaining screen for obtaining an account in the server 12 including the common driver. The display control section 83 also displays, on the display unit 34 of the terminal apparatus 10 using a browser, for example, a login screen for accessing the server 12.

If the user obtains an account in the server 12 including the common driver and logs in the server 12 by inputting a user ID and a password on the login screen, the display control section 83 displays a model selection screen for customizing the model information file 52. That is, the display control section 83 displays, on the printer property screen displayed on the terminal apparatus 10, a selection screen for allowing the user to select whether to include each model in the model list 61.

More specifically, a list of models compatible with the common driver illustrated in FIG. 6, for example, is displayed on the display screen of the terminal apparatus 10. In FIG. 6, "invalid" is selected for models whose maintenance periods have expired, and "valid" is selected for models whose maintenance periods have not expired.

The reception section 81 allows the user to select whether to include each model in the model list 61 displayed on the terminal apparatus 10 by the common control program 51.

Before the reception section 81 allows the user to select whether to include each model in the model list 61, the display control section 83 controls the selection screen of the terminal apparatus 10 such that models whose maintenance periods have expired are excluded from the model list 61. In addition, before the reception section 81 allows the user to select whether to include each model in the model list 61, the display control section 83 controls the selection screen such that a newly added model is included in the model list 61.

After the user selects, using the reception section 81, whether to include each model in the model list 61 displayed on the terminal apparatus 10 by the common control program 51, model setting information 53 that includes models determined using the reception section reception section 81 to be included in the model list 61 is stored in the storage unit 72 and associated with the user ID and the password input on the login screen. More specifically, if the user presses a "set" button 58 on the display screen illustrated in FIG. 6 on which the user has performed the selection for the models using the reception section 81, information regarding the selection is stored in the storage unit 72 as the model setting information 53 and associated with the user ID and the password to form a part of the account information 54 as illustrated in FIG. 7.

The model information file generation section 82 generates the model information file 52 using the model setting information 53 stored in the storage unit 72. That is, if the terminal apparatus 10 logs in the server 12, the model information file generation section 82 refers to the account information 54 and generates the model information file 52 using the model setting information 53 corresponding to the user ID and the password input at the time of login. That is, the model information file generation section 82 generates a customized model information file 52 using the model setting information 53 including models determined using the reception section 81 to be included in the model list 61.

Next, an example of a display screen after the common driver is activated to execute the common control program 51 will be described in detail with reference to FIGS. 8, 9A, and 9B.

After the common control program 51 is executed, the model list 61 for selecting a model name to be used in the common driver and the setting item list 62 that displays items settable for each model name are displayed on the property screen. The user may select one of two model modes, namely a model common mode and a model selection mode, on the model list 61.

In the model common mode, the same setting items are set for all models. In the model selection mode, a model name to be used is selected and setting items are set for the model name.

Figure 8:
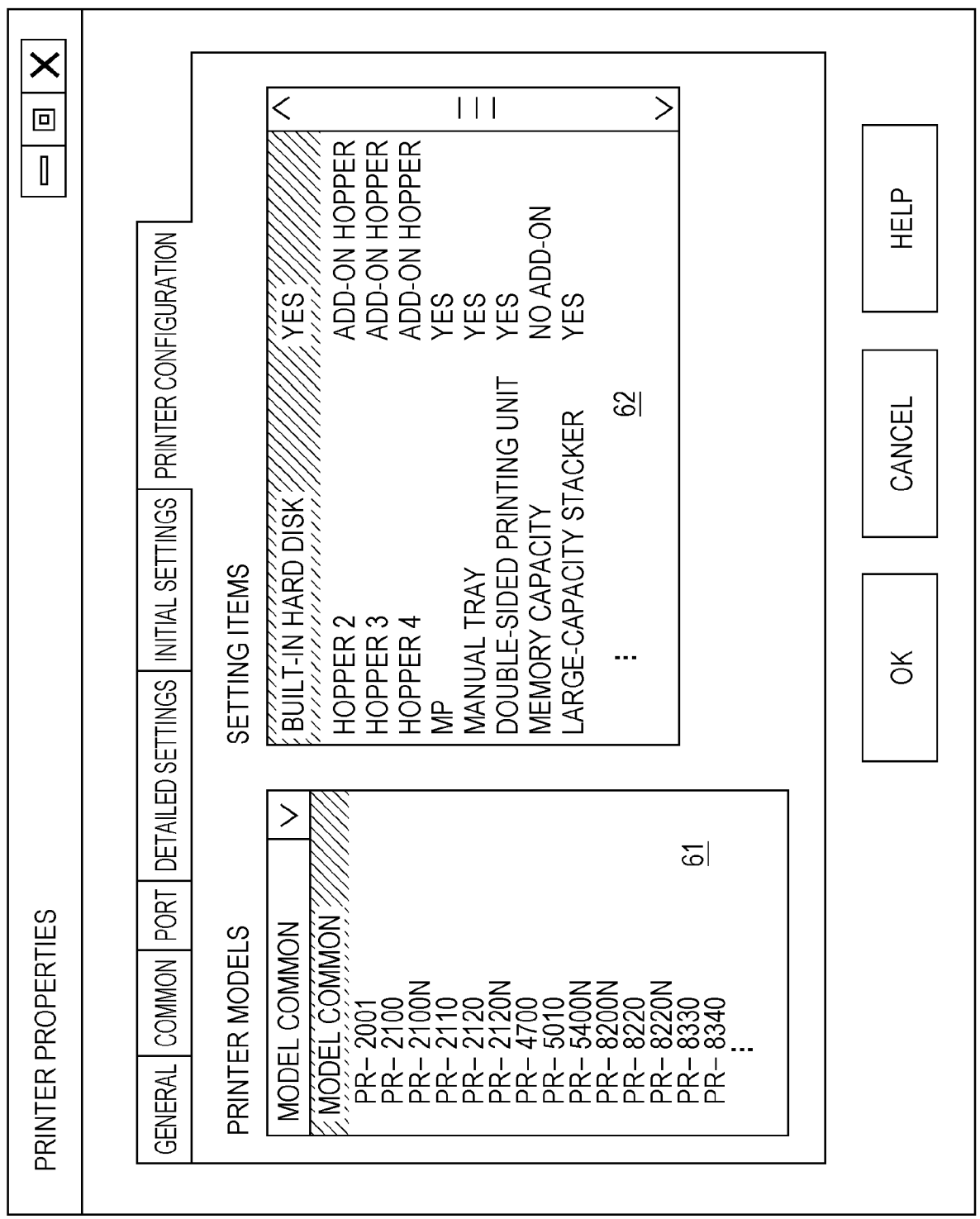
FIG. 8 is a diagram illustrating an example of another display screen of the display unit of the terminal apparatus according to the exemplary embodiment of the present disclosure.
Figure 9B:
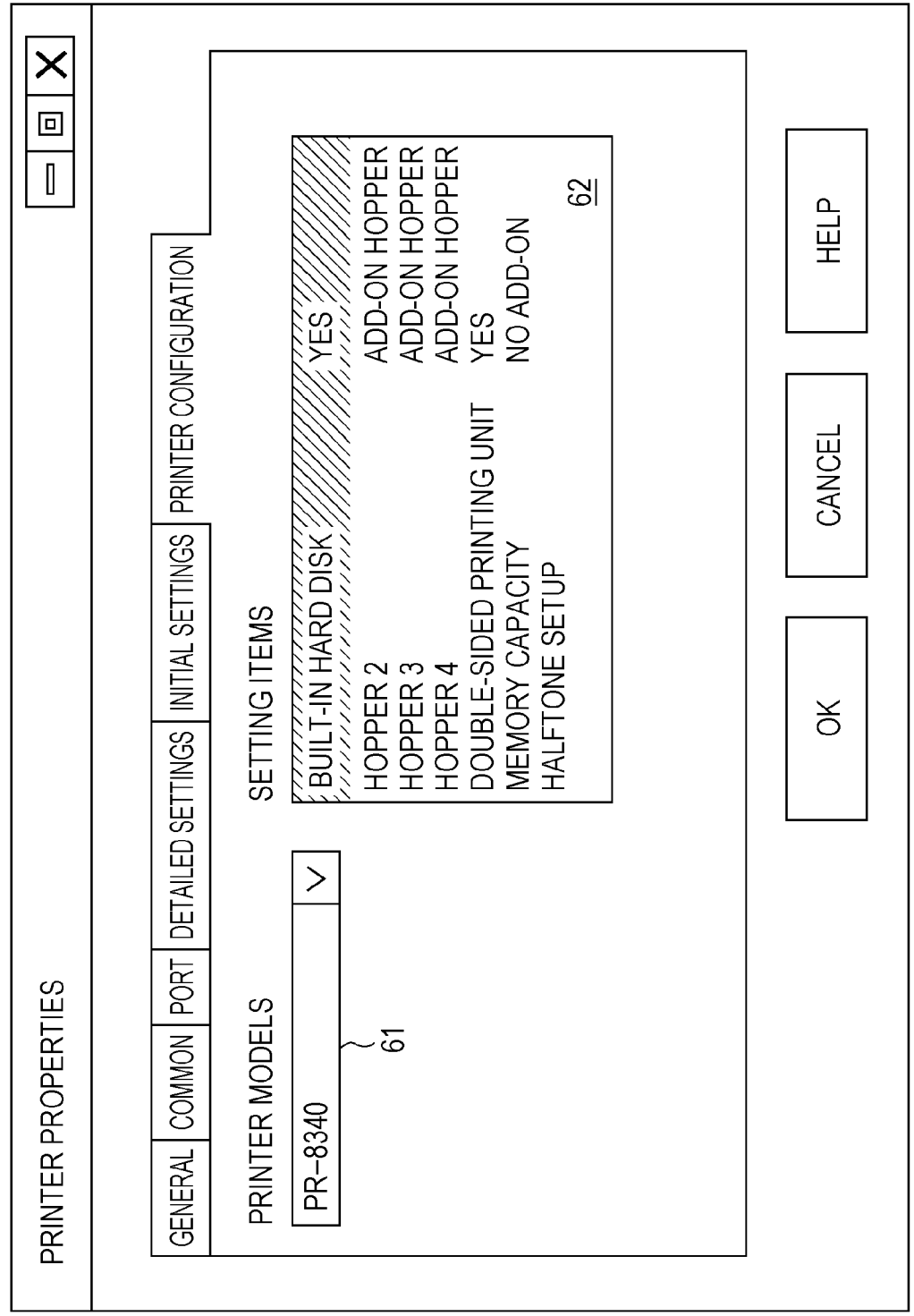

As illustrated in FIG. 8, if "model common" is selected on the model list 61, for example, the model common mode is established. Common setting items for different models are then displayed on the setting item list 62.

If a model name is selected on the model list 61, on the other hand, the model selection mode is established. Setting items corresponding to the selected model name are then displayed on the setting item list 62 as illustrated in FIGS. 9A and 9B.

Models names controllable by the common driver and setting items for each of the model names are displayed on the model list 61 and the setting item list 62, respectively, on the basis of the model information file 52 stored in the storage unit 33.

Next, an example of the operation of the information processing system according to the present exemplary embodiment will be described.

First, an operation performed by the terminal apparatus 10 to register the account information 54 regarding the user to the server 12 including the common driver will be described with reference to FIG. 10.

In step S10, the terminal apparatus 10 accesses the server 12 through the Internet 11 and obtains a login account for registering the account information 54 to the server 12. More specifically, the user obtains the login account on an account obtaining screen displayed on the display unit 34 of the terminal apparatus 10.

Next, in step S11, the login account of the user is registered to the server 12.

In step S12, the server 12 displays the login screen on the terminal apparatus 10.

In step S13, the terminal apparatus 10 accesses the server 12 on the login screen using the obtained login account.

As a result, a model selection screen for storing the model setting information 53 in the storage unit 72 is displayed on the display screen of the terminal apparatus 10. More specifically, a selection screen such as that illustrated in FIG. 6 is displayed. On the initial screen illustrated in FIG. 6, "invalid" is selected for models whose maintenance periods have expired, and "valid" is selected for models whose maintenance periods have not expired. The user may change the settings using the terminal apparatus 10. That is, the user may set, using the terminal apparatus 10, "valid" for models to be used and included in the model list 61 of the common driver and "invalid" for models not to be used and included in the model list 61.

If the user makes the settings using the terminal apparatus 10 and presses the "set" button 58 in step S15, the model setting information 53 regarding the selected models are stored in the storage unit 72 of the server 12 and associated with a user ID and a password to form a part of the account information 54 in step S16.

Next, an operation performed by the terminal apparatus 10 to obtain a customized model information file 52 will be described with reference to FIG. 11.

Figure 12:
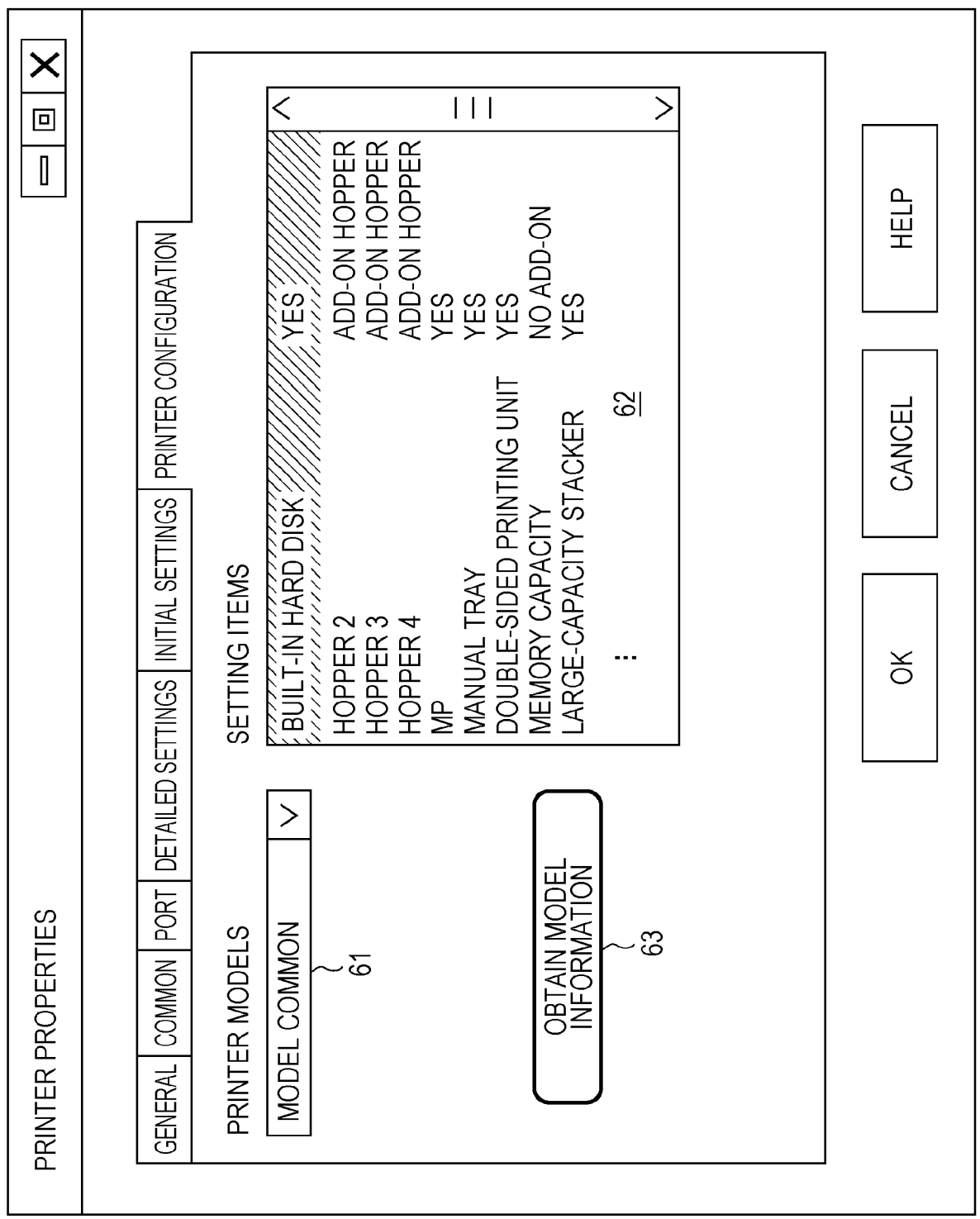
FIG. 12 is a diagram illustrating another example of the other display screen of the display unit of the terminal apparatus according to the exemplary embodiment of the present disclosure.
Figure 13:
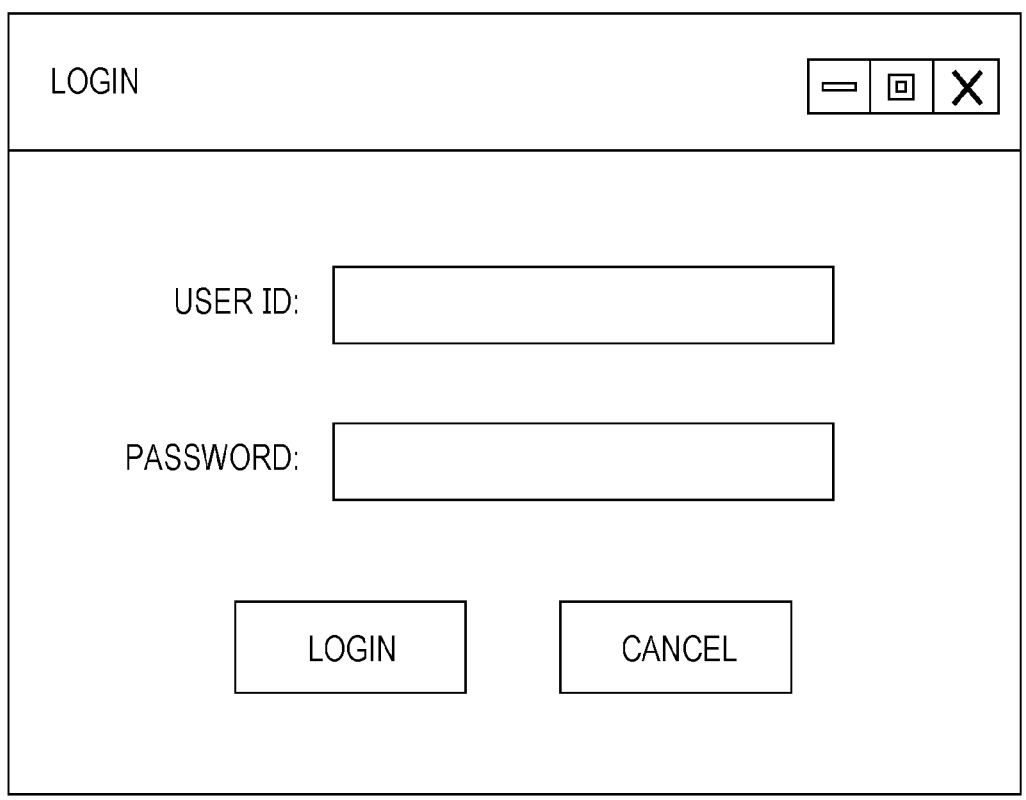
FIG. 13 is a diagram illustrating an example of another display screen of the display unit of the terminal apparatus according to the exemplary embodiment of the present disclosure.

If the user presses, in step S20, an "obtain model information" button 63 on a printer property screen of the common driver of the terminal apparatus 10 illustrated in FIG. 12, for example, a login screen illustrated in FIG. 13 is displayed in step S21 on the display unit 34 of the terminal apparatus 10.

Next, if a user ID and a password are input and a login button is pressed on the login screen of the terminal apparatus 10 in step S22, the terminal apparatus 10 is connected to the server 12 and a request to obtain a customized model information file 52 is issued.

As a result, the model information file generation section 82 generates, in step S23, a model information file 52 from the account information 54 stored in the storage unit 72 on the basis of the model setting information 53 associated with the user ID and the password used for the login.

In step S24, the customized model information file 52 is transmitted to the terminal apparatus 10.

In step S25, the terminal apparatus 10 stores the customized model information file 52 in the storage unit 33.

Figure 14:
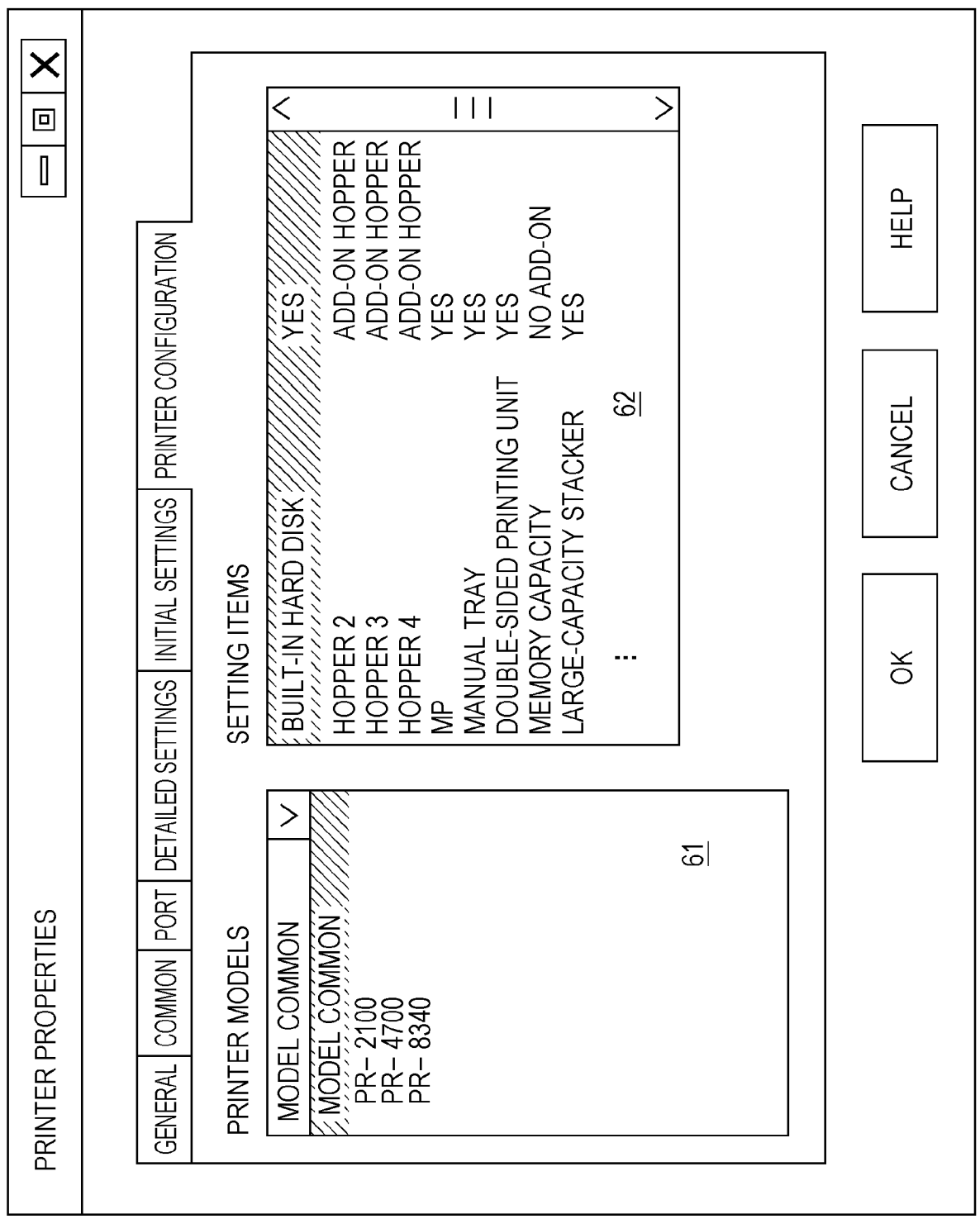
FIG. 14 is a diagram illustrating another example of the other display screen of the display unit of the terminal apparatus according to the exemplary embodiment of the present disclosure.

That is, the terminal apparatus 10 can execute the common driver and display a customized model list 61 on a printer property screen illustrated in FIG. 14 on the basis of the customized model information file 52. Models to be used with the terminal apparatus 10 can be included in the model list 61, and models not to be used with the terminal apparatus 10 can be excluded from the model list 61.

That is, not only a model list 61 based on the model information file 52 updated each time the common driver is updated but also a model list 61 based on a customized model information file 52 can be displayed.

If there is a model whose maintenance period has expired, the model is removed from the model list 61 by obtaining a latest model information file 52 from the server 12 without updating the common driver.

If there is a model whose maintenance period has expired but the user desires to keep using the model, the model remains in the model list 61 and continues to be used by using a customized model information file 52 in the server 12. Models whose maintenance periods have expired can thus be controlled by the common driver.

Even when the common control program has been updated in the common driver and a new model has been added, the common driver need not be updated if the user adds the new model to the model information file 52 by customizing the model information file 52 using the server 12.

Although the printers 2, 3, and 4 are used as an example of a plurality of apparatuses whose models are different from one another in the present exemplary embodiment, the present disclosure is not limited to this. The present disclosure may also be applied when other electronic devices are controlled using a common driver.

Although the terminal apparatus 10 is used as an example of an information processing apparatus in the present exemplary embodiment, the present disclosure is not limited to this. The present disclosure may also be applied when another information processing apparatus is used.

What is claimed is:

1. An information processing apparatus comprising a processor and a memory, the processor executing a common control program stored in the memory to be configured to:
   receive an instruction to obtain a model information file, which is list information regarding models controllable by a common control program;
   input, if the instruction to obtain the model information file is received, identification information regarding the information processing apparatus; and
   obtain, from an external management apparatus, a model information file corresponding to the identification information.

2. A management apparatus comprising a processor and a memory, the processor executing a common control program stored in the memory to be configured to:
   allow a user to determine whether to include each of models in a model list displayed to the user by a common control program;
   store in the memory, for identification information regarding each of users, model setting information including a model determined by the user to be included in the model list; and
   generate a model information file using the model setting information stored in the memory.

3. The management apparatus according to claim 2, the processor being further configured to control a display to display
   a selection screen for determining whether to include each of the models in the model list.

4. The management apparatus according to claim 3, wherein, before the user determines whether to include each of the models in the model list, the processor is configured to control the display to display the selection screen such that a model whose maintenance period has expired is excluded from the model list.

5. The management apparatus according to claim 3, wherein, before the user determines whether to include each of the models in the model list, the processor is configured to control the display to display the selection screen such that a newly added model is included in the model list.

6. An information processing system comprising:
a management apparatus that comprises a first processor and a first memory, the first processor executing a common control program stored in the first memory to be configured to
 allow a user to determine whether to include each of models in a model list displayed to the user by the common control program,
 generate a model information file including a model determined by the processor to be included in the model list, and
 store in the memory, for identification information regarding each of users, the model information file generated; and
an information processing apparatus that comprises a second processor, the second processor being configured to
 receive an instruction to obtain the model information file,
 input, if the second processor receives the instruction to obtain the model information file, identification information regarding the information processing apparatus, and
 obtain, from the management apparatus, a model information file corresponding to the identification information previously input.

7. A non-transitory computer readable medium storing a program causing a computer to execute a process, the process comprising:
 receiving an instruction to obtain a model information file, which is list information regarding models controllable by a common control program;
 inputting, if the instruction to obtain the model information file is received in the receiving, identification information regarding the computer; and
 obtaining, from an external management apparatus, a model information file corresponding to the identification information input in the inputting.

* * * * *